(12) United States Patent
Bienas et al.

(10) Patent No.: US 7,848,281 B2
(45) Date of Patent: Dec. 7, 2010

(54) METHOD FOR SELECTION OF AN AVAILABLE TRANSMISSION CHANNEL BY SENDING A NEGATIVE DECISION VALUE AND AN ADDITIONAL POSITIVE DECISION VALUE AND CORRESPONDING BASE STATION, MOBILE TERMINAL AND MOBILE RADIO NETWORK

(75) Inventors: Maik Bienas, Hannover (DE); Thomas Gottschalk, Berlin (DE); Norbert Schwagmann, Braunschweig (DE)

(73) Assignee: Siemens Aktiengesellschaft, Munich (DE)

( * ) Notice: Subject to any disclaimer, the term of this patent is extended or adjusted under 35 U.S.C. 154(b) by 412 days.

(21) Appl. No.: 10/568,976

(22) PCT Filed: Aug. 17, 2004

(86) PCT No.: PCT/EP2004/051811
§ 371 (c)(1),
(2), (4) Date: Oct. 17, 2006

(87) PCT Pub. No.: WO2005/020616
PCT Pub. Date: Mar. 3, 2005

(65) Prior Publication Data
US 2007/0140115 A1 Jun. 21, 2007

(30) Foreign Application Priority Data
Aug. 18, 2003 (DE) .................. 103 37 828

(51) Int. Cl.
*H04H 20/67* (2008.01)
(52) U.S. Cl. ................ 370/329; 370/341; 370/431; 455/450

(58) Field of Classification Search ........... 370/230, 370/462, 229, 143, 252, 294, 310, 328, 329, 370/335, 338, 342, 347, 431, 445–443, 447, 370/461, 515, 542; 455/464, 509, 431, 447, 455/450, 455, 466; 375/130, 141, 143, 148, 375/149, 152, 343; 709/225, 229
See application file for complete search history.

(56) References Cited

U.S. PATENT DOCUMENTS
5,742,639 A * 4/1998 Fasulo et al. ............... 375/219
(Continued)

FOREIGN PATENT DOCUMENTS
EP 1 351 448 A1 10/2003
(Continued)

OTHER PUBLICATIONS
International Search Report for International Application No. PCT/EP2004/051811; mailed Dec. 17, 2004.

*Primary Examiner*—Kamran Afshar
*Assistant Examiner*—Marisol Fahnert
(74) *Attorney, Agent, or Firm*—Staas & Halsey LLP

(57) ABSTRACT

A transmission channel, for the transmission of messages from a mobile terminal to a base station, is selected after a terminal sends a send authorization request signal, for a particular transmission channel, to the base station and the base station sends a reply signal with a first decision value. The terminal is thus signaled whether the terminal is authorized to send a message on the requested transmission channel. On sending a first negative decision value, the base station sends a second positive decision value with the reply signal, when the terminal is authorized to send a message on another transmission channel. On detection of a first negative decision value, the terminal analyzes the reply signal further for whether a second positive decision value is contained therein and which other transmission channels are available and hence sends the message on one of the available transmission channels.

20 Claims, 6 Drawing Sheets

U.S. PATENT DOCUMENTS

| | | |
|---|---|---|
| 6,480,525 B1 | 11/2002 | Parsa et al. |
| 6,490,453 B1 * | 12/2002 | Lee et al. .................... 455/450 |
| 6,708,037 B1 * | 3/2004 | Moulsley et al. ......... 455/452.1 |
| 6,907,015 B1 * | 6/2005 | Moulsley et al. ............ 370/329 |
| 6,925,561 B1 * | 8/2005 | Hunt et al. ................. 713/169 |
| 2002/0021683 A1 * | 2/2002 | Holtzman et al. ........... 370/335 |
| 2002/0080745 A1 | 6/2002 | Dick et al. |
| 2003/0139170 A1 | 7/2003 | Heo |

FOREIGN PATENT DOCUMENTS

| | | |
|---|---|---|
| WO | 01/10157 A1 | 2/2001 |
| WO | 01/11823 A2 | 2/2001 |
| WO | 01/33884 A1 | 5/2001 |
| WO | 03/003643 A1 | 1/2003 |

* cited by examiner

FIG 4 Prior art

| No. | Preamble signatures P | | | | | | | | | | | | | | | |
|---|---|---|---|---|---|---|---|---|---|---|---|---|---|---|---|---|
| $P_0$ | 1 | 1 | 1 | 1 | 1 | 1 | 1 | 1 | 1 | 1 | 1 | 1 | 1 | 1 | 1 | 1 |
| $P_1$ | 1 | -1 | 1 | -1 | 1 | -1 | 1 | -1 | 1 | -1 | 1 | -1 | 1 | -1 | 1 | -1 |
| $P_2$ | 1 | 1 | -1 | -1 | 1 | 1 | -1 | -1 | 1 | 1 | -1 | -1 | 1 | 1 | -1 | -1 |
| $P_3$ | 1 | -1 | -1 | 1 | 1 | -1 | -1 | 1 | 1 | -1 | -1 | 1 | 1 | -1 | -1 | 1 |
| $P_4$ | 1 | 1 | 1 | 1 | -1 | -1 | -1 | -1 | 1 | 1 | 1 | 1 | -1 | -1 | -1 | -1 |
| $P_5$ | 1 | -1 | 1 | -1 | -1 | 1 | -1 | 1 | 1 | -1 | 1 | -1 | -1 | 1 | -1 | 1 |
| $P_6$ | 1 | 1 | -1 | -1 | -1 | -1 | 1 | 1 | 1 | 1 | -1 | -1 | -1 | -1 | 1 | 1 |
| $P_7$ | 1 | -1 | -1 | 1 | -1 | 1 | 1 | -1 | 1 | -1 | -1 | 1 | -1 | 1 | 1 | -1 |
| $P_8$ | 1 | 1 | 1 | 1 | 1 | 1 | 1 | 1 | -1 | -1 | -1 | -1 | -1 | -1 | -1 | -1 |
| $P_9$ | 1 | -1 | 1 | -1 | 1 | -1 | 1 | -1 | -1 | 1 | -1 | 1 | -1 | 1 | -1 | 1 |
| $P_{10}$ | 1 | 1 | -1 | -1 | 1 | 1 | -1 | -1 | -1 | -1 | 1 | 1 | -1 | -1 | 1 | 1 |
| $P_{11}$ | 1 | -1 | -1 | 1 | 1 | -1 | -1 | 1 | -1 | 1 | 1 | -1 | -1 | 1 | 1 | -1 |
| $P_{12}$ | 1 | 1 | 1 | 1 | -1 | -1 | -1 | -1 | -1 | -1 | -1 | -1 | 1 | 1 | 1 | 1 |
| $P_{13}$ | 1 | -1 | 1 | -1 | -1 | 1 | -1 | 1 | -1 | 1 | -1 | 1 | 1 | -1 | 1 | -1 |
| $P_{14}$ | 1 | 1 | -1 | -1 | -1 | -1 | 1 | 1 | -1 | -1 | 1 | 1 | 1 | 1 | -1 | -1 |
| $P_{15}$ | 1 | -1 | -1 | 1 | -1 | 1 | 1 | -1 | -1 | 1 | 1 | -1 | 1 | -1 | -1 | 1 |

FIG 5 Prior art

| No. | AICH signature character sequences b | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| $b_0$ | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| $b_1$ | 1 | 1 | -1 | -1 | 1 | 1 | -1 | -1 | 1 | 1 | -1 | -1 | 1 | 1 | -1 | -1 | 1 | 1 | -1 | -1 | 1 | 1 | -1 | -1 | 1 | 1 | -1 | -1 | 1 | 1 | -1 | -1 |
| $b_2$ | 1 | 1 | 1 | 1 | -1 | -1 | -1 | -1 | 1 | 1 | 1 | 1 | -1 | -1 | -1 | -1 | 1 | 1 | 1 | 1 | -1 | -1 | -1 | -1 | 1 | 1 | 1 | 1 | -1 | -1 | -1 | -1 |
| $b_3$ | 1 | 1 | -1 | -1 | -1 | -1 | 1 | 1 | 1 | 1 | -1 | -1 | -1 | -1 | 1 | 1 | 1 | 1 | -1 | -1 | -1 | -1 | 1 | 1 | 1 | 1 | -1 | -1 | -1 | -1 | 1 | 1 |
| $b_4$ | 1 | 1 | 1 | 1 | 1 | 1 | 1 | 1 | -1 | -1 | -1 | -1 | -1 | -1 | -1 | -1 | 1 | 1 | 1 | 1 | 1 | 1 | 1 | 1 | -1 | -1 | -1 | -1 | -1 | -1 | -1 | -1 |
| $b_5$ | 1 | 1 | -1 | -1 | 1 | 1 | -1 | -1 | -1 | -1 | 1 | 1 | -1 | -1 | 1 | 1 | 1 | 1 | -1 | -1 | 1 | 1 | -1 | -1 | -1 | -1 | 1 | 1 | -1 | -1 | 1 | 1 |
| $b_6$ | 1 | 1 | 1 | 1 | -1 | -1 | -1 | -1 | -1 | -1 | -1 | -1 | 1 | 1 | 1 | 1 | 1 | 1 | 1 | 1 | -1 | -1 | -1 | -1 | -1 | -1 | -1 | -1 | 1 | 1 | 1 | 1 |
| $b_7$ | 1 | 1 | -1 | -1 | -1 | -1 | 1 | 1 | -1 | -1 | 1 | 1 | 1 | 1 | -1 | -1 | 1 | 1 | -1 | -1 | -1 | -1 | 1 | 1 | -1 | -1 | 1 | 1 | 1 | 1 | -1 | -1 |
| $b_8$ | 1 | 1 | 1 | 1 | 1 | 1 | 1 | 1 | 1 | 1 | 1 | 1 | 1 | 1 | 1 | 1 | -1 | -1 | -1 | -1 | -1 | -1 | -1 | -1 | -1 | -1 | -1 | -1 | -1 | -1 | -1 | -1 |
| $b_9$ | 1 | 1 | -1 | -1 | 1 | 1 | -1 | -1 | 1 | 1 | -1 | -1 | 1 | 1 | -1 | -1 | -1 | -1 | 1 | 1 | -1 | -1 | 1 | 1 | -1 | -1 | 1 | 1 | -1 | -1 | 1 | 1 |
| $b_{10}$ | 1 | 1 | 1 | 1 | -1 | -1 | -1 | -1 | 1 | 1 | 1 | 1 | -1 | -1 | -1 | -1 | -1 | -1 | -1 | -1 | 1 | 1 | 1 | 1 | -1 | -1 | -1 | -1 | 1 | 1 | 1 | 1 |
| $b_{11}$ | 1 | 1 | -1 | -1 | -1 | -1 | 1 | 1 | 1 | 1 | -1 | -1 | -1 | -1 | 1 | 1 | -1 | -1 | 1 | 1 | 1 | 1 | -1 | -1 | -1 | -1 | 1 | 1 | 1 | 1 | -1 | -1 |
| $b_{12}$ | 1 | 1 | 1 | 1 | 1 | 1 | 1 | 1 | -1 | -1 | -1 | -1 | -1 | -1 | -1 | -1 | -1 | -1 | -1 | -1 | -1 | -1 | -1 | -1 | 1 | 1 | 1 | 1 | 1 | 1 | 1 | 1 |
| $b_{13}$ | 1 | 1 | -1 | -1 | 1 | 1 | -1 | -1 | -1 | -1 | 1 | 1 | -1 | -1 | 1 | 1 | -1 | -1 | 1 | 1 | -1 | -1 | 1 | 1 | 1 | 1 | -1 | -1 | 1 | 1 | -1 | -1 |
| $b_{14}$ | 1 | 1 | 1 | 1 | -1 | -1 | -1 | -1 | -1 | -1 | -1 | -1 | 1 | 1 | 1 | 1 | -1 | -1 | -1 | -1 | 1 | 1 | 1 | 1 | 1 | 1 | 1 | 1 | -1 | -1 | -1 | -1 |
| $b_{15}$ | 1 | 1 | -1 | -1 | -1 | -1 | 1 | 1 | -1 | -1 | 1 | 1 | 1 | 1 | -1 | -1 | -1 | -1 | 1 | 1 | 1 | 1 | -1 | -1 | 1 | 1 | -1 | -1 | -1 | -1 | 1 | 1 |

| No. | AICH signature character sequences |
|---|---|
| $b2_0$ | 1 -1 1 -1 1 -1 1 -1 1 -1 1 -1 1 -1 1 -1 1 -1 1 -1 1 -1 1 -1 1 -1 1 -1 1 -1 1 -1 |
| $b2_1$ | 1 1 -1 -1 1 1 -1 -1 1 1 -1 -1 1 1 -1 -1 1 1 -1 -1 1 1 -1 -1 1 1 -1 -1 1 1 -1 -1 |
| $b2_2$ | 1 -1 -1 1 1 -1 -1 1 1 -1 -1 1 1 -1 -1 1 1 -1 -1 1 1 -1 -1 1 1 -1 -1 1 1 -1 -1 1 |
| $b2_3$ | 1 1 1 1 -1 -1 -1 -1 1 1 1 1 -1 -1 -1 -1 1 1 1 1 -1 -1 -1 -1 1 1 1 1 -1 -1 -1 -1 |
| $b2_4$ | 1 -1 1 -1 -1 1 -1 1 1 -1 1 -1 -1 1 -1 1 1 -1 1 -1 -1 1 -1 1 1 -1 1 -1 -1 1 -1 1 |
| $b2_5$ | 1 1 -1 -1 -1 -1 1 1 1 1 -1 -1 -1 -1 1 1 1 1 -1 -1 -1 -1 1 1 1 1 -1 -1 -1 -1 1 1 |
| $b2_6$ | 1 -1 -1 1 -1 1 1 -1 1 -1 -1 1 -1 1 1 -1 1 -1 -1 1 -1 1 1 -1 1 -1 -1 1 -1 1 1 -1 |
| $b2_7$ | 1 1 1 1 1 1 1 1 -1 -1 -1 -1 -1 -1 -1 -1 1 1 1 1 1 1 1 1 -1 -1 -1 -1 -1 -1 -1 -1 |
| $b2_8$ | 1 -1 1 -1 1 -1 1 -1 -1 1 -1 1 -1 1 -1 1 1 -1 1 -1 1 -1 1 -1 -1 1 -1 1 -1 1 -1 1 |
| $b2_9$ | 1 1 -1 -1 1 1 -1 -1 -1 -1 1 1 -1 -1 1 1 1 1 -1 -1 1 1 -1 -1 -1 -1 1 1 -1 -1 1 1 |
| $b2_{10}$ | 1 -1 -1 1 1 -1 -1 1 -1 1 1 -1 -1 1 1 -1 1 -1 -1 1 1 -1 -1 1 -1 1 1 -1 -1 1 1 -1 |
| $b2_{11}$ | 1 1 1 1 -1 -1 -1 -1 -1 -1 -1 -1 1 1 1 1 1 1 1 1 -1 -1 -1 -1 -1 -1 -1 -1 1 1 1 1 |
| $b2_{12}$ | 1 -1 1 -1 -1 1 -1 1 -1 1 -1 1 1 -1 1 -1 1 -1 1 -1 -1 1 -1 1 -1 1 -1 1 1 -1 1 -1 |
| $b2_{13}$ | 1 1 -1 -1 -1 -1 1 1 -1 -1 1 1 1 1 -1 -1 1 1 -1 -1 -1 -1 1 1 -1 -1 1 1 1 1 -1 -1 |
| $b2_{14}$ | 1 -1 -1 1 -1 1 1 -1 -1 1 1 -1 1 -1 -1 1 1 -1 -1 1 -1 1 1 -1 -1 1 1 -1 1 -1 -1 1 |
| $b2_{15}$ | 1 1 1 1 1 1 1 1 1 1 1 1 1 1 1 1 -1 -1 -1 -1 -1 -1 -1 -1 -1 -1 -1 -1 -1 -1 -1 -1 |

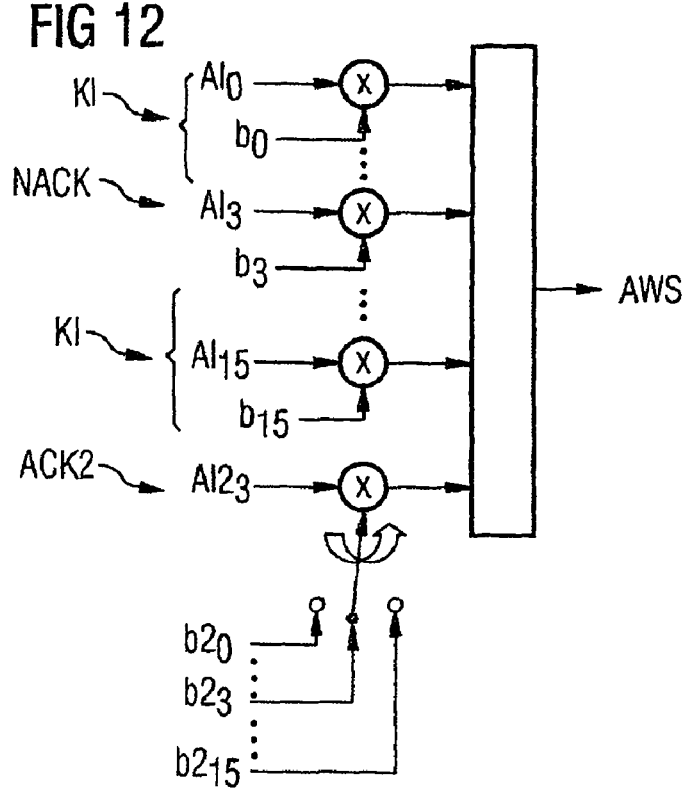
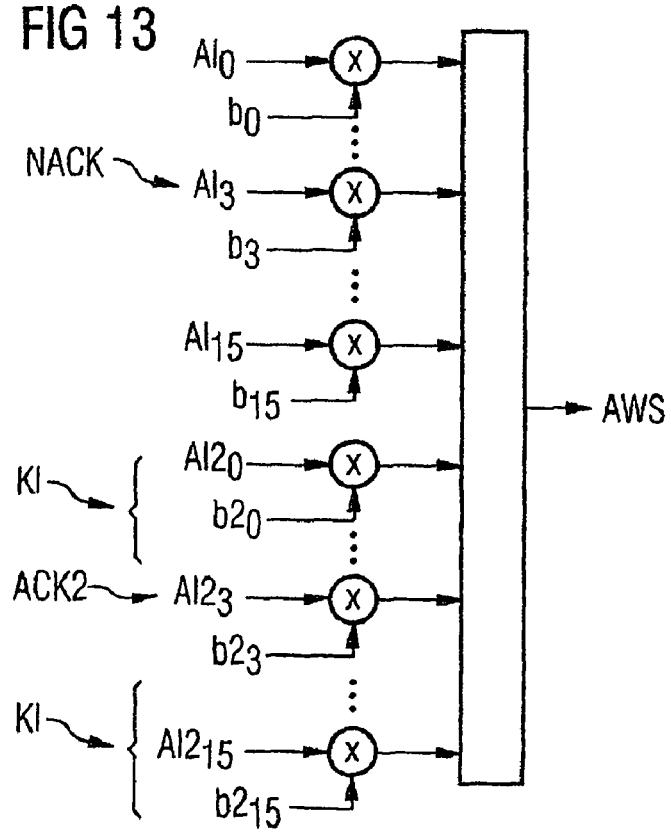

METHOD FOR SELECTION OF AN AVAILABLE TRANSMISSION CHANNEL BY SENDING A NEGATIVE DECISION VALUE AND AN ADDITIONAL POSITIVE DECISION VALUE AND CORRESPONDING BASE STATION, MOBILE TERMINAL AND MOBILE RADIO NETWORK

CROSS REFERENCE TO RELATED APPLICATIONS

This application is based on and hereby claims priority to German Application No. 10337828.6 filed on Aug. 18, 2003, the contents of which are hereby incorporated by reference.

BACKGROUND OF THE INVENTION

1. Field of the Invention

The invention relates to a method for selecting a transmission channel for transmission of messages from a mobile terminal to a base station, in which the terminal initially sends a send authorization request signal for a specific transmission channel to the base station and the base station then sends a response signal to the terminal, which contains a first decision value, with which the terminal is signaled whether or not it is authorized to send a message on the requested transmission channel. In addition the invention relates to a corresponding terminal and a base station which can be used to carry out such a method.

2. Description of the Related Art

In cellular mobile radio systems a communication connection between a mobile terminal, also referred to as a terminal, a mobile radio device or "User Equipment" (UE) below, and the mobile radio network is established via a base station which serves the mobile radio subscribers in a specific group—in what is known as a cell—via one or more radio channels. Such a base station—in the UMTS (UMTS=Universal Mobile Telecommunication System) also known as "Node B"—provides the actual radio interface between the mobile radio network and the mobile terminal. It takes over the handling of radio operation with the various mobile subscribers within its cell and monitors the physical radio connections. In addition it transfers network and status messages to the terminals.

Such a base station must feature at least one transceiver unit with suitable antenna device as well as a processor device, which control the various processes within the base station. Likewise the individual terminals must each feature corresponding transceiver units with suitable antenna devices and corresponding processor devices in each case which control the various processes in the relevant terminal.

In mobile radio a distinction is made between two connection directions. The forwards direction (Downlink, DL) describes the direction from the base station to the terminal, the backwards direction (Uplink, UL) the direction from the terminal to the base station In such cases a plurality of different transmission channels exist in either direction. With more modern mobile radio standards, such as the UMTS standard, there are two types of transport channel for the transmission of data: One type is the dedicated channels and the other is the common channels. A dedicated channel is reserved solely for the transmission of information for or from a specific terminal. Such a resource can for example be implemented by a specific frequency, or with systems operating in accordance with the CDMA (CDMA=Code Division Multiple Access) method, by using different spread codes on the same frequency. Information from the base station which is intended for all terminals can be transmitted on the common channels or the various terminals can share these channels, with each terminal only using the channel for a brief period.

It makes sense for the radio traffic within such a cell between the various terminals and the base station to be organized so that the base station is in a position, as regards the load imposed on it, to process all data and/or that the situation is avoided as far as possible in which different terminals are transmitting simultaneously on the same channels to the base station and collisions occur as a result. To this end which terminal which may send a message to the base station and the time at which it may send it should be defined in some way. The procedure mentioned at the start is executed for this purpose for example.

A typical example of such a selection procedure of a transmission channel is the random access procedure in the UMTS standard. This method is used to define which terminal may send a short message on which logical transmission channel to the base station, to inquire for example whether a call may be set up via the base station concerned or to send brief status information to the base station for example. The term "logical transmission channel" is in this case to be understood as the terminals using one and the same physical shared uplink channel, with the terminals employing different channelization codes. The base station can distinguish between the messages and signals sent by the various terminals on this physical common channel on the basis of the channelization codes, as if they had been sent on different channels. The common channel used is actually the "PRACH" (Physical Random Access Channel). In the current UMTS standard there are 16 different channelization codes currently available in the PRACH, i.e. 16 different logical transmission channels are implemented on the PRACH.

Before a mobile terminal uses the PRACH, on entering a specific cell for example, the terminal does not know which channelization codes are currently being used by other mobile terminals in this cell and which are free. As described at the start, the terminal therefore first sends to the base station a send authorization request signal—referred to in the UMTS standard as an access preamble. This access preamble is uniquely assigned to a specific channelization code or a specific logical transmission channel. The base station then sends a response signal, which either contains a confirmation that the device may send a message with this channelization code or with which the sending of the message with this channelization code is refused. Signaling is undertaken in this case with an individual decision value—in the UMTS standard in the form of an Acquisition Indicator. This Acquisition Indicator is sent on a specific downlink channel, known as the AICH (Acquisition Indicator Channel) from the base station to the terminals. The AICH—like the PRACH—is a Common Channel, which is to be received by all terminals. The Acquisition Indicator is multiplied on transmission by a specific signature character sequence, which in its turn is uniquely assigned to the channelization code concerned, for which the terminal has previously sent the send authorization request signal, so that the terminal concerned knows that it will be allowed or forbidden to send the message with this channelization code. With the current standard for executing the random access method the terminal receives via the common channel BCH (Broadcast Channel) which is permanently sent out by the base station of a specific cell, information about the channelization codes available as well as the necessary information as to when and if at all a send authorization request signal can be sent to the base station. From the potential channelization codes or logical transmission channels available for this mobile radio device, the mobile radio device then selects any given code and sends the access preamble for this specific transmission channel with a specific transmit power. If no response signal arrives after a specific time, it sends a send authorization request signal once again at increased power and for another transmission channel. If it then receives a response signal with a positive first decision value, it finally sends the message on the requested transmission channel—i.e. with specific channelization code on the PRACH—to the base station. For a negative decision value the procedure begins from the start, i.e. the terminal sends to the base station a further send authorization request for another transmission channel.

This method is acceptable provided it only relatively rarely occurs that the base station responds to an access preamble with a negative decision value, i.e. refuses the transmission on the transmission channel concerned. This is for example the case for methods in which a negative decision value is only sent if the base station is overloaded and cannot process any further data. Where the load on the base station continues to increase however or if a method is used in which specific transmission channels are also kept free for specific terminals for a specific time in order to prevent collisions, the number of the negative decision values increases significantly. In this case the method is ineffective since the terminal must request each individual possible transmission channel by sending out a suitable send authorization request signal.

SUMMARY OF THE INVENTION

An object of the present invention is to improve a method of the type mentioned at the start so that the mobile terminals are provided more quickly and effectively with a transmission channel for sending a message to the base station with the smallest possible signal overhead as well as to specify a corresponding base station and mobile radio devices for executing this type of more effective transmission channel selection method.

This object is achieved in that the base station, on transferring a first negative decision value with which the terminal is refused the sending of a message on the requested transmission channel, sends a second positive decision value with a response signal to the terminal when the terminal is authorized to send a message on another channel. The terminal then thoroughly further analyzes the response signal on detection of first negative decision value in the response signal to see whether it contains such a second positive decision value and to see which other transmission channels are currently available, i.e. are not occupied. Subsequently the terminal then sends the message to the base station on one of the available transmission channels.

This method has the great advantage that—provided other transmission channels are available for the current transmission of messages to the base station for which the terminal concerned has however not just sent the send authorization request signal—the result is not simply a mere rejection of the send authorization request signal. Instead the terminal is given the option of sending on another free transmission channel without having to send a send authorization request signal again. This makes the selection process faster. In addition unnecessary data traffic for repeated requests from the mobile radio devices is avoided. From the base station side the method appears such that the base station initially receives a send authorization request signal for a specific transmission channel from the terminal and then sends a response signal to a terminal which contains the relevant decision value. In this case the base station, on transfer of first negative decision value, sends a second positive decision value with the response signal to the terminal if the terminal is authorized to send a message on another channel. To this end an inventive base station must feature a processor device with corresponding means for selecting a transmission channel. These include a decoding device which is used for detection of a send authorization request signal sent by a terminal for a specific transmission channel, and a channel release device to determine those transmission channels which are currently available for transmission of a message. In addition a coding device is needed to send a response signal to the terminal which contains the first decision value concerned. In this case the processor device must be embodied such that, on transfer the first negative decision value, a second positive decision value is accordingly sent with the response signal to the terminal if the terminal is authorized to send a message on another channel. The means for selecting a transmission channel, especially the decoding device, the channel release device and also the encoding device, are preferably realized in the form of software in the processor device of the base station.

From the mobile radio device side the method appears such that the device initially sends a send authorization request signal in a known way to the base station and then it receives from the base station a response signal in which it finally detects a first decision value. If the terminal detects a first negative decision value the response signal is further thoroughly analyzed to see if it contains a second positive decision value signaling to the terminal at the permission to send a message on another channel and indicating which other transmission channels are available. Subsequently the message is sent by the terminal on one of the other available transmission channels. For this purpose the mobile radio device must feature a processor device with a device for selecting a transmission channel which includes an authorization request device for generating the send authorization request signal and a decoding device which decodes the response signal sent by the base station. In this case the decoding device must be embodied such that, on detection of the first negative decision value it accordingly further analyzes the response signal in order to find any possible second positive decision value and to check which other transmission channels are available for this. The processor device must be embodied such that the message is then sent on one of the other transmission channels available. The facility for selecting a transmission channel in the mobile radio device, especially the authorization request device and the decoding device is preferably realized in the form of software in the processor device of the mobile radio device.

The method is basically applicable to any type of transmission channel. This means that the method can for example be used to select one of a number of physical transmission channels. An important application however consists of selecting one of the number of logical transmission channels which are realized by using a different channelization code on a physical transmission channel, which is used as a common channel by a number of terminals to transfer messages to a base station. This method is especially suitable for improving the random access method described at the start in accordance with the current UMTS standard.

In an especially preferred exemplary embodiment the response signal contains explicit channel status information with which a signal can be sent to the terminal concerned as to which other transmission channels are available for sending a message. As an alternative or in addition the terminal can decode the response signal to see whether it contains further positive or negative decision values for other terminals which relate to other transmission channels.

This requires that the response signal is sent on a common downlink channel which can be decoded by all terminals and can simultaneously contain decision values for the send authorization request signal of different devices, as is the case with AICH for example.

It is especially preferable for any second decision value sent and/or the channel status information to be encoded within the response signal such that, depending on whether a specific response signal contains a second decision value and/or explicit channel status information at all, the first decision value can be decoded unchanged by the terminal. In other words, the encoding of the information additionally transferred is undertaken such that the encoding of the previously sent response signal is not changed. As regards the random access method in the UMTS standard already mentioned several times, this means that for example the Acquisition Indicator is sent as before in accordance with the usual UMTS specification (3GPP TS 25.211 or TS 25.213 Release 99). This has the advantage that the entire method is upwards-compatible so that even terminals which are not equipped for executing the inventive method can still decode the response signal in the usual way and can detect the first decision value. Conversely the response signals from base stations can also be received with terminals which operate in accordance with the inventive method which do not send any second decision values since they are not equipped accordingly. As already described at the start for example, in the UMTS method the acquisition indicator serving as the decision value is transferred on the AICH, with the latter being multiplied by a signature character sequence for encoding the Acquisition Indicator which is assigned to the send authorization request signal or the desired channelization code. This means that a specific set of signature character sequences exists which are used for encoding the first decision values in the response signal. The individual signature character sequences of this set are orthogonal to each other in each case In order to encode the second decision value and/or the channel status information such that the first decision value can be decoded independently of it, the second positive decision value and/or the channel status information will be preferably encoded by a signature character sequence in the response signal which is orthogonal to the first set of signature character sequences which is used for encoding the first decision value.

Such a signature character sequence for encoding the second positive decision value and/or the channel status information can preferably be created by multiplying each second character of a signature character sequence of the first signature character sequence set by "−1". Thus a new signature character sequence orthogonal to the first signature character sequence set is automatically created. In principle it is possible for the base station to only create a signature character sequence orthogonal to the first signature character sequence set if this is needed for encoding the second decision value or channel status information respectively. To this end the base station or its encoding device must feature a corresponding character sequence generation unit and in order to encode the second decision value and/or the channel status information accordingly. Likewise the terminal would have to feature a corresponding character sequence generation unit for encoding.

Preferably however a complete second set of signature character sequences is stored in each case in the corresponding memory devices of the base station or of the terminal, with the signature character sequences of this second signature character sequence set being orthogonal to each other and to all signature character sequences of first signature character sequence set. In this case the corresponding signature character sequences of the second signature character sequence set can be generated in each case from the signature character sequences of the first signature character sequence set by multiplying each second character by a "−1".

There are a very wide variety of options for the transmission of the second positive decision value as well as of the channel status information.

With a first method the second positive decision value is transferred jointly with the channel status information in a character string which is encoded with a specific signature character sequence orthogonal to the first signature character sequence set, for example with a signature character sequence from the second signature character sequence set.

In this case especially preferably a signature character sequence is used which is permanently assigned to the relevant base station, in which case it should be ensured that adjacent base stations use different second signature character sequences.

With an alternative method the second positive decision value for a specific terminal is encoded separately with a specific signature character sequence orthogonal to the first signature character sequence set and which is assigned to the transmission channel for which the terminal concerned has previously sent a send authorization request signal to the base station.

In addition the response signal can then contain a second negative decision value as channel status information for each transmission channel occupied at the time concerned. In this case, in accordance with the first variant, the second negative decision values are each encoded with a signature character sequence from the first signature character sequence set assigned to the occupied transmission channels concerned. In a second variant the second negative decision values will by contrast be encoded with signature character sequences from the second set of signature character sequences which are again assigned to the occupied transmission channels concerned.

BRIEF DESCRIPTION OF THE DRAWINGS

These and other objects and advantages of the present invention will become more apparent and more readily appreciated from the following description of exemplary embodiments, taken in conjunction with the accompanying drawings of which:

FIG. 4 is a table with 16 different preamble signature character sequences PS orthogonal to each other for encoding of the Access Preamble in the UMTS method, FIG. 5 is a table with 16 AICH signature character sequences bs orthogonal to each other for encoding the Acquisition Indicator in the UMTS method.

FIG. 12 is a schematic diagram of a first variant for forming a response signal for a random access method in accordance with FIG. 11, FIG. 13 is a schematic diagram of a second variant for forming a response signal or a random access method in accordance with FIG. 11.

DETAILED DESCRIPTION OF THE PREFERRED EMBODIMENT

Figure 1:
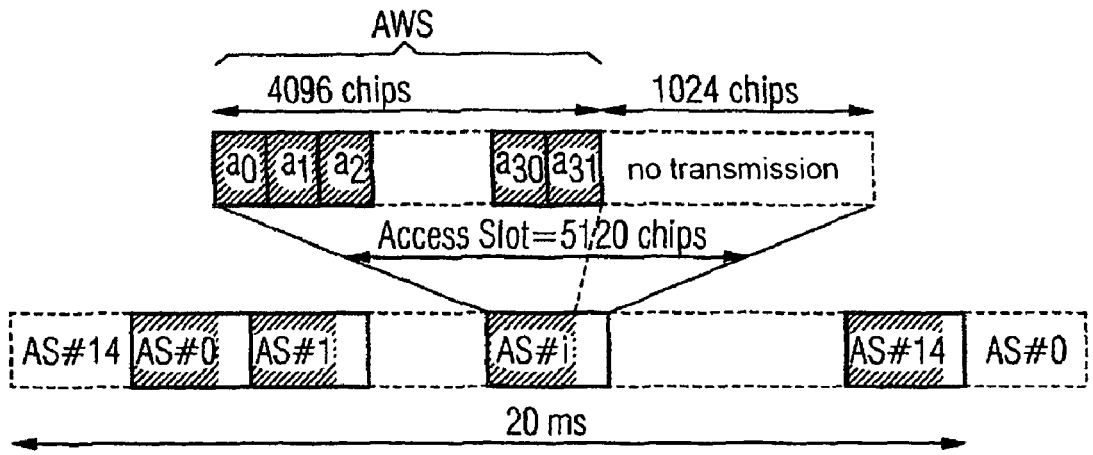
FIG. 1 is a schematic diagram of the layout of the AICH channel in the UMTS standard in accordance with the related art.

Reference will now be made in detail to the preferred embodiments of the present invention, examples of which are illustrated in the accompanying drawings, wherein like reference numerals refer to like elements throughout.

All exemplary embodiments of the invention shown in the drawings relate to an inventive improvement of the random access method in FDD Mode (Frequency Division Duplex-Mode) of the UMTS standard. The invention is not restricted to this application however.

In the UMTS mobile radio network a number of mobile radio devices can send simultaneously on one frequency in the uplink or will be serviced by one base station in the downlink. This is made possible in that, by using different spread codes which are orthogonal to each other, the bandwidth of a signal is spread and thus different physical channels are created on a frequency.

As already explained at the start there are dedicated channels in the UMTS standard, which are permanently assigned to the individual devices, and common channels which are used by a number of devices. Such a common channel in the uplink area is what is referred to as the PRACH which the individual terminals briefly use to transmit messages to the base station, for example requests for a call set-up. The RACH (Random Access Channel) transport channel is mapped onto the PRACH physical channel. Within a specific cell, i.e. a specific base station, this PRACH is assigned a quite specific scrambling code. Likewise each dedicated channel in the uplink possesses its own scrambling code.

On the downlink side there are likewise different common channels, for example the BCH and the AICH mentioned at the start. The AICH is divided up into radio frames (RF) of 20 ms in length. A radio frame in its turn contains 15 access slots (AS). This is shown for the AICH in FIG. 1. Each access slot AS contains 120 chips, with 4096 chips currently being used for the transmission and 1024 chips not being occupied. A total of 32 real-value symbols aa, . . . , a31 are accommodated in these 4096 chips. The part of the PRACH in which the access preambles are sent is also structured in a corresponding manner. An access preamble also contains 4096 chips, which is produced by spreading a signature of length 16 by the factor 256. The PRACH message part is divided up into radio frames of length 10 ms, with a radio frame consisting of 15 slots (time slots). A slot is thus half as long as an access slot and contains 2560 chips. A PRACH message can be 10 or 20 ms in length in accordance with the related art.

Figure 2:
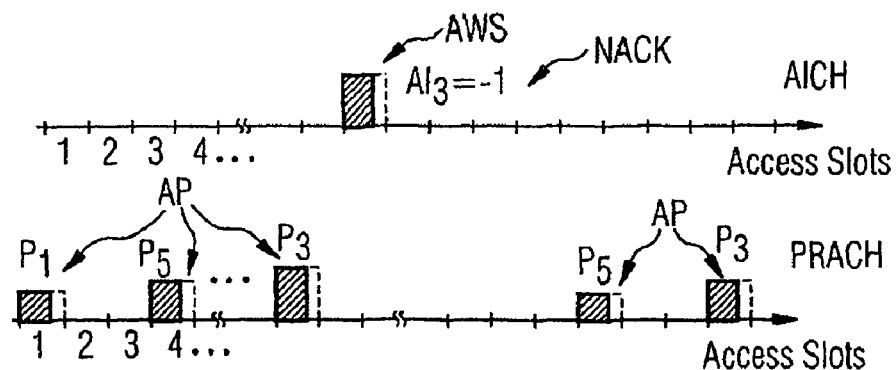
FIG. 2 is a schematic diagram of the sequence of the random access method in accordance with the related art when a negative decision value is returned.
Figure 3:
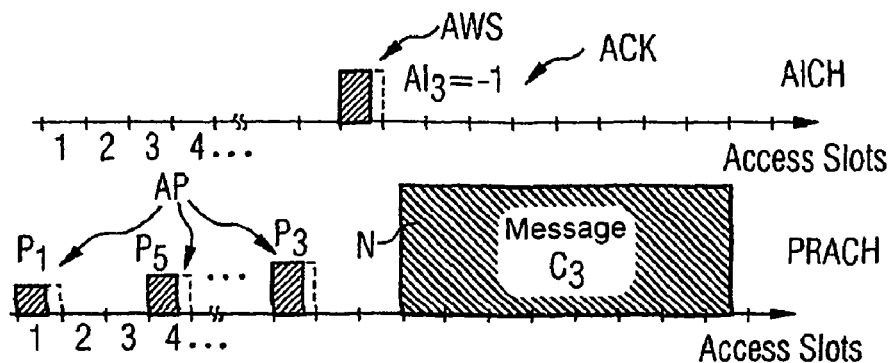
FIG. 3 is a schematic diagram of the random access method in accordance with the related art when a positive decision value is returned.

The random access method currently used in the UMTS standard is described once again in greater detail In FIGS. 2 and 3, with FIG. 2 showing the case in which sending by the terminal on a requested channel is refused, and FIG. 3 the case in which a positive send acknowledgement is provided.

The method begins with a terminal thoroughly analyzing the BCH which is permanently sent out by a base station permanent to ascertain which spread code is being used on the PRACH for this base station, which channelization codes $C_S$ could basically be used by the terminal concerned in this cell and which Access Slots AS are available on the PRACH for the terminal concerned. In the exemplary embodiment shown in FIGS. 2 and 3 the terminal basically has the channelization codes $C_1$, $C_3$ and $C_5$ available to it. The terminal then deliberately chooses one of the channelization codes $C_1$, $C_3$, $C_5$ available and sends the base station an access preamble AP for this code in a specific Access Slot AS allowed for the terminal. The Access Preamble AP, also called the send authorization request signal in this document, includes the scrambling code of the PRACH of the base station and a preamble signature $P_0, \ldots, P_{15}$, to which the 16 possible channelization codes $C_0, \ldots, C_{15}$ are assigned.

The 16 different preamble signatures $P_0, \ldots, P_{15}$ are shown in FIG. 4. By multiplying a preamble signature PS belonging to a specific channelization code $C_S$ by the scrambling code of the PRACH, with the preamble signature PS being repeated 256 times, the Access Preamble AP is produced.

With the exemplary embodiment shown in FIGS. 2 and 3 the terminal first sends an Access Preamble AP at a specific power. with the preamble signature P1 for the channelization code C1. If the terminal does not then receive a response signal on the AICH, a new Access Preamble AP with increased power is sent in next available Access Slot AS. In this case a new preamble signature $P_S$ is again selected at random. In the exemplary embodiments shown the preamble signature is $P_5$, i.e. a send authorization request signal AP relating to the channelization code $C_5$ is sent.

This is done until such time as a response signal AWS is finally received on the AICH. What is known as an Acquisition Indicator $AI_S$ (with S=0, . . . , 15) is contained in this response signal as decision value ACK, NACK. This Acquisition Indicator $AI_S$ has either the value "1" or "−1", depending on a positive decision value ACK is involved, by which the terminal is authorized to send on the requested channel or with the requested channelization code $C_S$ or whether a negative decision value NACK is involved, with which the sending of this channelization code $C_S$ is refused.

The response signal will be formed in this case so that the relevant Acquisition Indicator $AI_s$ is multiplied by an AICH signature character sequence $b_s$, with each signature character sequence $b_s$, again being assigned to precisely one of the 16 channelization codes $C_s$. The multiplication of the Acquisition Indicator $AI_s$ by the corresponding AICH signature character sequence $b_s$ allows the terminal to detect whether the received decision value ACK, NACK or Acquisition Indicator $AI_s$ is the response to the access preamble AP that it has sent.

Figure 6:
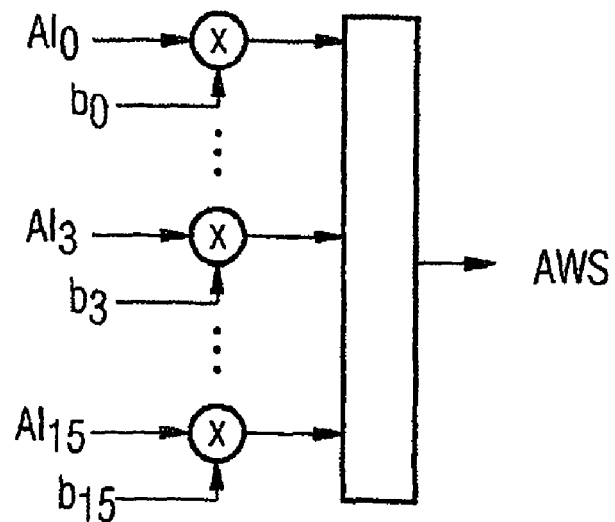
FIG. 6 is a schematic diagram of the formation of a response signal for the random access method in the current UMTS standard.

As FIG. 6 shows, it is possible to multiply up to 16 different Acquisition Indicators by the associated AICH signature character sequence bs in each case and subsequently to add them, i.e. up to 16 Acquisition Indicators AI can be sent simultaneously in a response signal AWS. The individual AICH signature character sequences $b_s$ each consist of 32 values in such cases (see FIG. 5). Bitwise addition of the individual results of the multiplication of the Acquisition Indicators by the associated AICH signature character sequences $b_s$ produces the 32 AICH symbols $a_0, \ldots, a_{31}$, as shown in FIG. 1.

If the base station sends a response signal AWS on the AICH with a negative decision value ACK, the terminal aborts the procedure. In the example shown in FIG. 2 this is a corresponding Acquisition Indicator $AI_3$ which corresponds to the access preamble $P_3$ previously sent by the terminal, with a value of "−1". A specific time later it then sends a new access preamble AP to the base station again in a permitted access slot with a randomly selected preamble signature $P_1$, $P_3$, $P_5$, i.e. the procedure starts again. If on the other hand a positive decision value ACK is contained in the response signal, in FIG. 3 the Acquisition Indicator $AI_3$=1, the terminal sends the desired message N to the base station on the PRACH with the requested channelization code $C_3$.

It is immediately evident from FIGS. 2 and 3 that this method is acceptable provided the base station only rarely returns a negative decision value NACK. In accordance with the present UMTS standard this is the case, since a negative decision value NACK is only sent if the hardware of the base station is no longer in a position to process further data. The chances of messages colliding on the PRACH are consequently relatively low.

Figure 7:
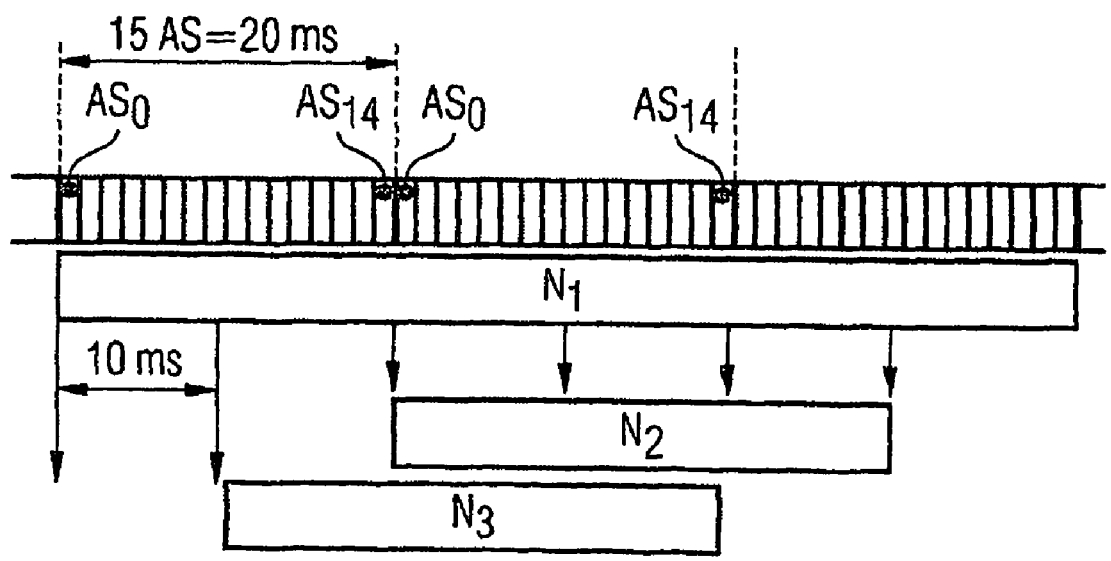
FIG. 7 is a schematic diagram of the transmission of messages of different length on the PRACH channel in the UMTS method.

In accordance with the current standard, messages sent on the PRACH may only have a length of 10 or 20 milliseconds. Thus a collision between messages of different terminals at a base station which begin at the same start time is relatively rare. Reference is made to FIG. 7 here. As is shown in this Figure, the duration of a radio frame for the access preamble amounts to 20 milliseconds, with 15 access slots AS being accommodated in a radio frame. The beginning of a message can always only lie at the start time of an access slot AS. The scrambling code used for the PRACH message part on the other hand has the length of 10 milliseconds. If the message to be sent $N_1$, $N_2$, $N_3$ is longer than 10 milliseconds, the scrambling code is extended by repeating it. This means that messages which are sent with the same channelization code $C_S$ cannot be distinguished by the base station if the start times of the messages differ by 10 milliseconds or a whole number multiple of this. In this case the simultaneous message parts logically combined with the same section of the scrambling code and the messages can no longer be distinguished for the base station. They must then be sent again. Since within a time frame of 20 milliseconds there are only 15 of possible start times—the start times of the access slots AS—a there is no possible start time for a PRACH message after 10 milliseconds. Only after 20 milliseconds can the situation actually occur that a message N3 collides with a further message N1 which then starts and uses the same scrambling and channelization code. To extend the maximum message length to over 20 million seconds and thus, to effectively allow the transmission of more complex messages on the PRACH, a more active channel management is required. For example, a check should be made as to which channels are already used by other terminals, i.e. are blocked. Such active channel management however necessarily has the consequence of the number of rejections of send authorization request signals of the terminals increasing. Thus it is also entirely sensible to have a more effective method for selecting a transmission channel or a channelization code $C_s$ for sending messages N on the PRACH channel.

With the inventive method proposed a second positive decision value ACK2 is thus sent where necessary to the terminal in the response signal in addition to the first decision value ACK, NACK, where the value is negative, if any terminal has the opportunity of sending the message N on another free channel or with another free channelization code. In addition, in the exemplary embodiment shown, explicit channel status information KI is sent to the terminal on the basis of which the terminal can then establish which channel could be used. This is shown schematically in FIG. 8.

As a comparison between the figure and FIGS. 2 and 3 shows, the terminal also sends multiple requests here with the corresponding access preamble AP with different preamble signatures $P_1$, $P_2$, $P_5$, which relate to different channelization codes $C_1$, $C_2$, $C_5$ to ask the base station whether a message N may be sent with the channelization codes $C_1$, $C_2$, $C_5$ concerned on the PRACH. As occurs in the example shown in FIG. 2, here too there is a response signal AWS of the base station to the last request in which the preamble signature $P_3$ was used with a negative decision value NACK (here too again $AI_3$=−1). But in addition a second positive decision value ACK2 as well as channel information KI are contained in the response signal AWS with which it is signaled to the terminal that it can send a message with the channelization code $C_5$. After this the terminal sends the message N with the channelization code $C_5$ in the next permitted access slot In this way rejections of seizure requests for the PRACH despite available free resources are prevented by sending additional information.

Figures 8, 9:
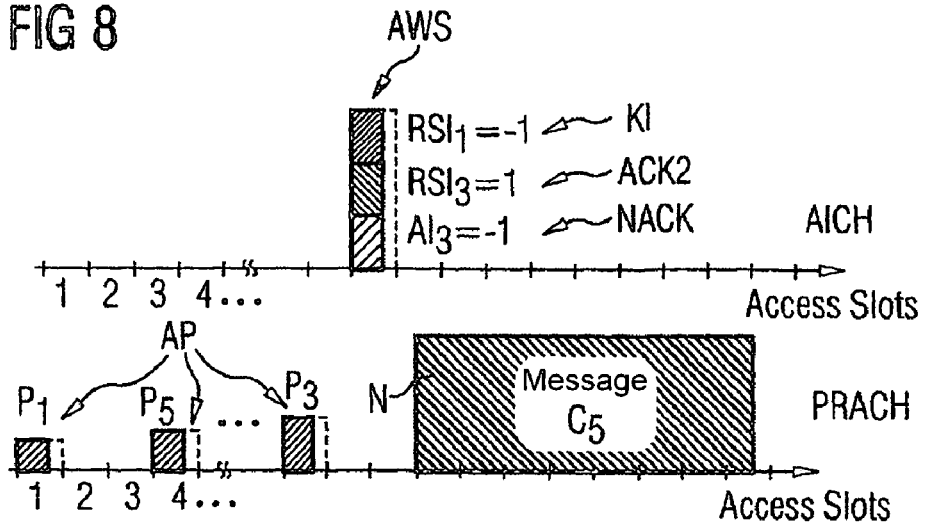
FIG. 8 is a schematic diagram of an inventive random access method in accordance with a first exemplary embodiment.
FIG. 9 is a table with 16 AICH signature character sequences of a second AICH signature character sequence set orthogonal to each other.
Figure 10:
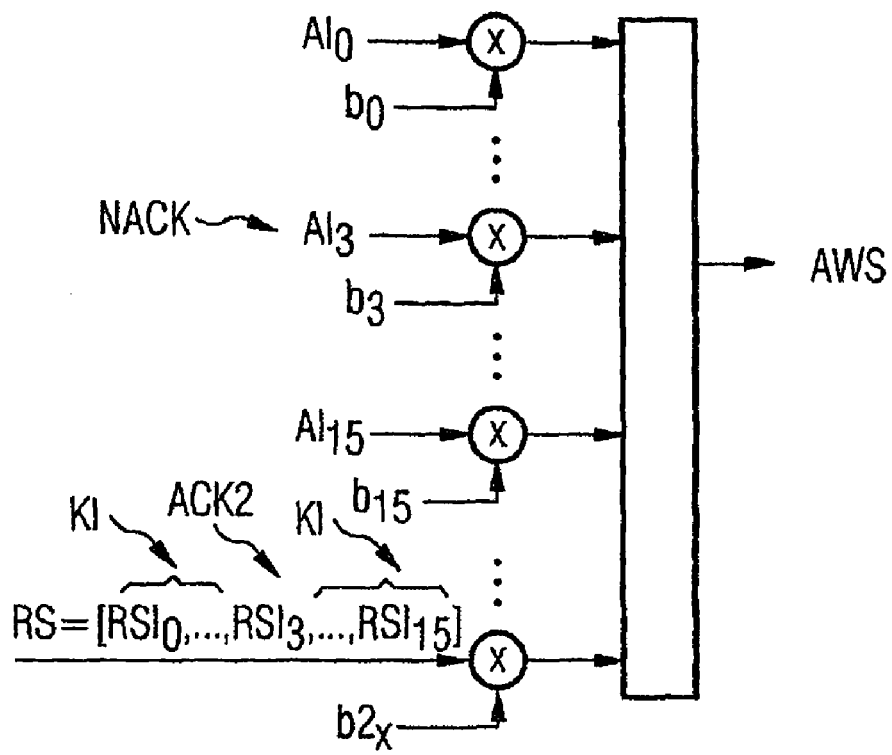
FIG. 10 is a schematic diagram of the formation of a response signal in a random access method in accordance with FIG. 8

The additional information is decoded in this case in the response signal AWS in such a way that the method is fully downwards-compatible with the existing UMTS method. To this end 16 new additional AICH signature character sequences $b2_0, \ldots, b2_{15}$ are defined. The AICH signature character sequences of this second AICH signature character sequence set b2 are orthogonal to each other in each case and orthogonal to all existing AICH signature character sequences $b_0, \ldots, b_{15}$ of the first AICH signature character sequence set b, with which the previous Acquisition Indicators AI are encoded. The new AICH signature character sequence set b2 is shown in FIG. 9. As a comparison with FIG. 5 shows, the individual signature character sequences $b2_0, \ldots, b2_{15}$ of the second set b2 are formed by the leading sign of each second value of the corresponding signature character sequences $b2_0, \ldots, b2_{15}$ of the first "normal" signature character sequence set b being transposed i.e. the value being multiplied by "−1". Since this second signature character sequence set b2 is orthogonal to the first signature character sequence set b, additional information can be encoded with the signature character sequences $b2_0, \ldots, b2_{15}$ and sent jointly with the previous information without the transmission of the previous Acquisition Indicator AI being changed. The other execution sequences, especially the execution sequence for sending the access preamble AP, also remain as in the previous standard. In FIGS. 8 and 10 in this case a first option is shown for sending to the terminal the second positive decision value ACK2 and the necessary channel information KI. In this method the base station sends a negative decision value NACK in the case the request from the mobile radio device for a specific occupied channelization code $C_5$ (in FIG. 8 the code $C_3$), i.e. $AI_3$=1, precisely as in the related art. In addition channel status information KI is sent which consists of a total of 16 RACH status indicators $RSI_0, \ldots, RSI_{15}$, with each status indicator $RSI_S$ (with $S=_{0,\ldots,15}$) being assigned to precisely one specific channelization code $C_s$. If the status indicator $RSI_S$=−1, this means that the corresponding channelization code $C_S$ is occupied. A status indicator $RSI_S$=0 means that the associated channelization code $C_S$ is free. The status of the channelization code $C_s'$ belonging to the preamble signature $P_s'$ sent can be detected by the mobile radio device from the received negative first decision value NACK. It is therefore not necessary to send the associated status indicator $RSI_S$, within the channel information KI with the value "−1". This status indicator $RSI_S$, can thus be used to give the mobile radio device the right to send a message on a free channelization code $C_S$, i.e. a second positive decision value ACK2 is sent with this value by setting the status indicator $RSI_S$, concerned to=1.

In this case it is also possible—if the base station simultaneously sends a number of negative decision values NACK or positive decision values ACK in a response signal in the same access slot AS to different terminals—to send the associated status indicators RSI with the value "0". The mobile radio device involved receives the status of these associated channelization codes $C_s$ with reference to the first decision values NACK, ACK determined for the other mobile radio devices by thoroughly evaluating the response signal sent. The associated $C_s$ are then seized although the status indicators $RSI_S$ have the value "0," i.e., the first decision values NACK, ACK sent in each case are given a higher priority than the status indicators $RSI_S$.

Overall with this method—provided a first negative decision value NACK is sent to a terminal and a second positive decision value ACK2 is to be sent—a maximum of 16 different status indicators $RSI_S, \ldots, RSI_{15}$ are transferred. FIG. 10 shows in this case how the encoding and transmission can be undertaken in the response signal AWS to the base station. A status indicator character sequence $R_S$ which is 16 characters long is formed from the individual status indicators $RSI_S, \ldots, RSI_{15}$. This character sequence RS can then be encoded with an AICH signature character sequence $b2_0, \ldots, b2_{15}$ from the second AICH signature character sequence set $b2_s$. Because of the orthogonality of this additional signature character sequence to the first signature character sequence set b, the character sequence arising can then be added into the response signal AWS without influencing the transmitted first decision values or Acquisition Indicators $AI_0, \ldots, AI_{15}$. This only requires a single, basically freely selectable signature character sequence $b2_x$ from the second signature character sequence set b2, with preferably this signature character sequence $b2_x$ being assigned to the base station concerned.

In the concrete exemplary embodiment in accordance with FIG. 8 the status indicator $RSI_3$ corresponding to the requested channelization code $C_3$ is set to =1. This corresponds to a positive second decision value ACK2. A status indicator $RSI_1 = -1$ is also sent as additional channel status information KI, meaning that the channelization code C is also occupied. Since on the one hand, because of the first negative decision value NACK it is already known that the channelization code C3 is also busy and only the channelization codes $C_1, C_5, C_3$ are available to the terminal, on the other hand however it was signaled to the terminal with the second positive decision value ACK2 that is may send on a free channel, only the channelization code $C_5$ still remains free for sending which is then used by the terminal for sending the message N.

A further description is provided below of the extent to which the change to the random access method requires modifications in the base station and the terminal itself:

After the base station has received a seizure request in the form of an access preamble AP with the preamble signature $P_{s'}$ it checks whether the associated channelization code $C_{s'}$ of the PRACH is occupied or not.

If the channelization code $C_{s'}$ is free, the base station sends an Acquisition Indicator $AI_{s'}=1$ as in the related art.

If the channelization code $C_{s'}$ is occupied, the base station sends a NACK on the AICH, i.e. an Acquisition Indicator $AI_{s'}=-1$. The Acquisition Indicator $AI_{s'}$ is in this case sent in each case with an AICH signature character sequence $b_{s'}$ from the usual first signature character sequence set b, which belongs to the Preamble Signature $P_s$ and thus to the occupied channelization code $C_{s'}$ sent by the mobile radio device.

If only the requested channelization code $C_{s'}$ is occupied, the additional status indicator character sequence RS is sent in addition to the NACK. In this case only the $RSI_{s'}$ belonging to the requested channelization code $C_{s'}$ contains the value "1". This is the second positive decision value ACK2. All other RSIS are sent with the value 0, i.e. "nothing" is sent there. In this way the mobile radio device recognizes that only the channelization code $C_{s'}$ is occupied and that it can look for a free channelization code $C_s$ and may send its message N with this code.

If at least one channelization code $C_s$ is free and if in addition to the requested channelization code $C_{s'}$ further channelization codes $C_{s''}$ are occupied the base station also sends with the first negative decision value NACK a status indicator character sequence RS. The status value $RSI_{s'}$ belonging to the requested channelization code$_{s'}$ again contains the value "1" as a second positive decision value ACK2. The $RSI_{s''}$ belonging to occupied channelization codes $C_{s''}$ (for which no negative decision value ACK and positive decision value NACK are sent at the same time to another terminal) are given the value "−1" ($C_s$ is occupied). All other status values $RSI_s$ are given the value "0" ($C_s$ is free). For this the base station uses a previously permanently defined signature $b2_x$ from the second signature character sequence set b2 in each case. Since the additional status indicator character sequence RS is scrambled with the same scrambling code as the AICH it can be logically considered as part of the AICH.

If all channelization codes are occupied only a negative decision value NACK is sent as in the usual manner and no additional status indicator character sequence RS.

After the base station has sent the terminal a status indicator character sequence RS it waits 3 or 4 access slots after receiving the last access preamble for a message N from the terminal concerned with one of the non-occupied channelization codes $C_{s'}$ In this case channelization codes $C_s$ with a lower index "S" are preferably used by the terminal. This accelerates the search by the base station for the channelization code $C_s$ used. As quickly as possible a-base station determines the channelization code $C_s$ actually used and blocks this for other mobile radio devices for the period during which the mobile radio device is sending its PRACH message part.

The second positive decision value ACK2 is needed to identify the mobile radio device which is authorized to send. If a number of mobile radio devices are sending seizure requests at the same time of which the preamble signatures $P_{s'}$ belong to occupied channelization codes $C_{s'}$ radio devices are then prevented from starting to send after receiving a first negative decision value NACK. Only the mobile radio device which receives the second positive decision value ACK2 belonging to "its" preamble signature $P_S'$ may begin and to send the message.

For the mobile radio device this method is presented as follows:

1. The mobile radio device decodes the BCH as with the related art which is sent by the base station in this cell and among other things receives the access slots allowed for it and the preamble signatures as well as the scrambling code for the access preamble.

2. The mobile radio device selects an access slot AS and a preamble signature $Ps_i$ at random as usual from those allowed for it and sends a corresponding access preamble AP with a calculated power.

3. The mobile radio device then decodes the AICH and looks for the acquisition indicator $AI_s'$ belonging to its sent access preamble $P_s$, and stores the signal of the received AICH including any status indicator character string RS which may have been received.

If a first positive decision value ACK, i.e. $AI_s=1$ is received, the mobile radio device begins to send its message N 3 or 4 access slots after sending the last access preamble on the PRACH with the channelization code $C_s$, belonging to the last preamble signature $P_s$. The stored signal of the AICH is deleted.

If a first negative decision value NACK, i.e. $AI_s=-1$ is received, the mobile radio device evaluates the status indicator character string RS in the stored signal. Each status indicator $RSI_{s''}$ with the value "−1" belongs to a channelization code $C_s$ which is currently occupied. These channelization codes $C_s$ are temporarily erased from the list of the channelization codes available to this mobile radio device. In addition a search is made for first negative decision values NACK and second positive decision values ACK which do not belong to the preamble signature $P_s$, sent. The associated channelization codes are also erased temporarily.

The options available are then as follows:

a) If an available channelization code $C_s$ is still present, the mobile radio device selects this code. If a number of channelization codes $C_s$ are present, the mobile radio device selects the channelization code $C_s$ with the smallest index "S". Subsequently the mobile radio devices begins to send its message on the PRACH with the selected channelization code 3 or 4 access slots after sending the last access preamble.

b) If no available channelization code CS is present, the mobile radio device ends its access attempt.

c) If the status indicator $RSI_s$ belonging to $P_s$ was not received with the value "1", the mobile radio device likewise ends its access attempt. This is the case, if for example all channelization codes $C_s$ are occupied or if the base station does not support this new functionality. This ensures the compatibility of the mobile radio devices with new technology to base stations in accordance with the related art.

4. If no first negative or positive decision value ACK, NACK is received, the mobile radio device selects a new preamble signature at random as before from those allowed for it and sends a new access preamble AP with an increased power in the next access slot available to it.

Figure 11:
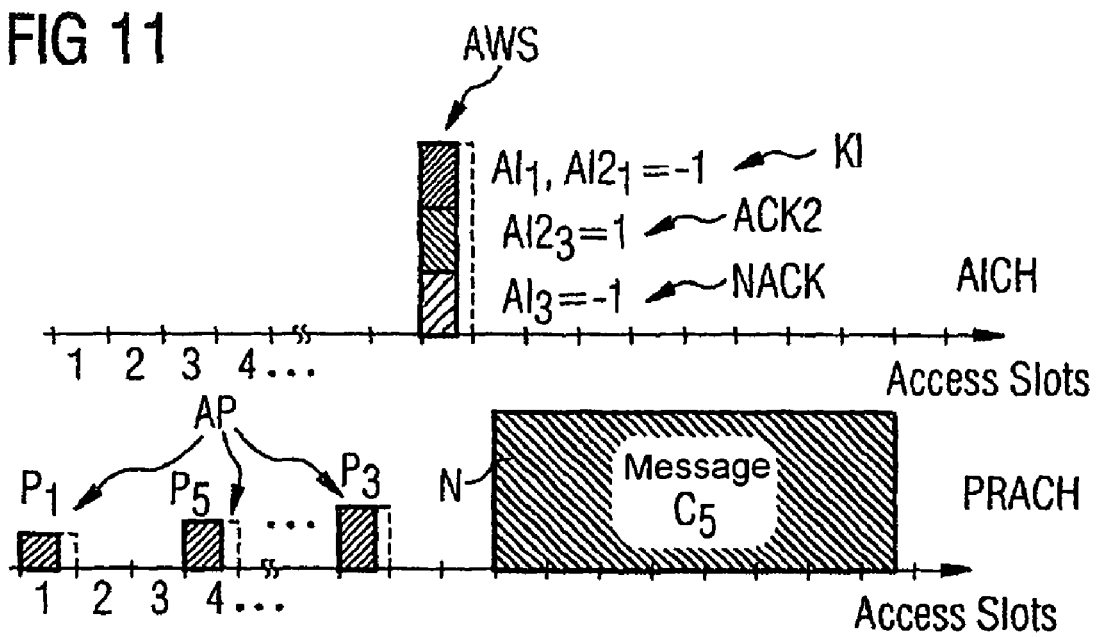
FIG. 11 is a schematic diagram of an inventive random access method in accordance with a second exemplary embodiment.

With an alternative method the base station, in the event of a request from the terminal for an occupied channelization code $C_s$, sends a conventional negative decision value as usual. In addition another one or more negative decision values NACK2 are sent and for each further occupied channelization code $C_{s''}$, a separate negative decision value NACK2 is sent provided an appropriate first decision value ACK, NACK has not already been sent within the response signal. This is shown in FIG. 11. Here, on the request for the channelization code $C_3$ (through encoding of the access preamble AP with the preamble signature $P_3$) the usual negative decision value NACK is sent in the form of an Acquisition Indicator $AI_3=-1$. In addition a second positive decision value ACK2 will be sent in the form of a second Acquisition Indicator $AI2_3=1$. In addition a corresponding Acquisition Indicator $AI_1$ is sent as channel status information for all further channels $C_{s''}$, which are of interest for the terminal concerned, here for the channelization code $C_1$, provided the channelization code $C_{s''}$ concerned is occupied.

The second positive decision value ACK2 is encoded in this case in any event with the aid of an AICH signature character sequence from the second set b2. Fur the transmission of the remaining Acquisition Indicators as additional channel status information KI on the other hand, there is the option, as shown in FIG. 12, of using the signature character sequences $b_0, \ldots, b_{15}$ of the first set b assigned to the channelization code $C_1, \ldots, C_{15}$ or, as in FIG. 13, the signature character sequences $b2_0, \ldots, b2_{15}$ of the second set b2.

This means, with the variant in accordance with FIG. 12, only a single signature character sequence $b2_0, \ldots, b2_{15}$ of the second set b2 will be used and with this the second positive decision value ACK2 transferred in the form of the additional Acquisition Indicator $AI_3$. Negative first decision values $AI_0, \ldots, AI_{15}$ corresponding with the AICH signature character sets $b_0, \ldots, b_{15}$ of the first set b are encoded as usual as channel status information KI and the response signal AWS formed from these.

With the variant in accordance with FIG. 13 by contrast all channel status information KI is encoded as second Acquisition Indicators $AI2_0, \ldots, AI2_{15}$ with AICH signature character sequences $b2_0, \ldots, b2_{15}$ of the second set b2 being encoded and sent jointly with the first decision values or Acquisition Indicators in the response signal AWS.

In order to execute this transmission method the following modifications are made in the base station:

After the base station has received a seizure request in the form of an access preamble AP with the preamble signature $P_s$, it checks whether the associated channelization code $C_s$, of the PRACH is occupied or not.

If the requested channelization code $C_s$, is free, the base station sends a first positive decision value ACK in a known manner, e.g. $AI_s=1$, on the AICH.

If the requested channelization code $C_s$, is occupied, the base station sends a first negative decision value NACK in the same manner and with the same encoding, i.e. $AI_s=-1$.

If further channelization codes $C_{s''}$ are occupied, but at least one channelization code $C_s$ is free, the base station sends for each further occupied channelization code $C_{s''}$ a second negative decision value NACK2 on the AICH. For example, the base station sends a value $AI_{s''}=-1$ with an AICH signature character sequence which belongs to the channelization code $C_{s''}$ which is currently occupied.

In this case the base station selects in each case in a first variant for encoding an AICH signature character sequence $b_0, \ldots, b_{15}$ from the first signature character sequence set b. This method has the advantage that, if a first mobile radio device sends an access preamble AP of which the preamble signature $P_s$, belongs to an occupied channelization code $C_s$, and the base station is sending at this moment to another second mobile radio device the set of the occupied channelization Codes $C_{s''}$ in the form the second negative decision values NACK2. The seizure request of the first mobile radio device is also negatively acknowledged in this way, even if the base station has not yet received the seizure request of the first mobile radio device. This shortens the time between sending the access preamble AP and receiving the negative decision value NACK.

With a second variant a signature character sequence $b2_0, \ldots, b2_{15}$ is selected from the second signature character sequence set b2 in each case. This method has the advantage that, if a first mobile radio device sends an access preamble AP for which the preamble signature $P_s$, belongs to an occupied channelization code $C_s$, and the base station is sending at this moment to another mobile radio device the set of the occupied channelization codes $C_s$, in the form of the second negative decision values NACK2 the seizure request of the first mobile radio device will not be negatively acknowledged by the receipt of the second negative decision values NACK2, since these were sent with an AICH signature character sequence $b2_0, \ldots, b2_{15}$ from the new signature character sequence set b2 and the first mobile radio device expects a response with an AICH signature character sequence $b_0, \ldots, b_{15}$ from the first signature character sequence set b. If possible, at the time at which the base station has understood the request of the first mobile radio device, the desired channelization code $C_{s'}$ is again free, so that the mobile radio device can send its message.

This reduces the number of additional random access attempts.

If at least one channelization code CS is free, the base station sends with an AICH signature character sequence $b2_{s'}$ from the second set b2, which belongs to the received preamble signature $P_{s'}$ a second positive decision value ACK2, in the form of an additional Acquisition Indicator $AI2_{s'}=1$.

If all channelization codes are occupied only a first negative decision value NACK is sent with the usual corresponding AICH signature character sequence $b_{s'}$ and no positive second decision value ACK2.

After the base station has sent a positive second decision value ACK2 it expects, 3 or 4 access slots AS after receiving the last access preamble AP, to receive a message N with one of the non-occupied channelization codes $C_s$. With this method too channelization codes $C_s$ with a smaller index "S" are again preferably used to accelerate the base station's search for the channelization code $C_s$ used. The base station determines the channelization code $C_s$ actually used as quickly as possible and blocks this for the other mobile radio devices for the period in which the mobile radio device concerned is sending its PRACH message part N.

As regards the mobile radio device, the known procedure is modified as follows:

1. The mobile radio device decodes the BCH sent from the base station to each mobile radio device of this cell as usual, in order to ascertain the access slots AS and preamble signatures $P_s$ allowed for it as well as the scrambling code for the access preamble AP.
2. The mobile radio device selects an access slot AS and a preamble signature $P_s$ from those allowed for it at random as before, and sends an access preamble AP.
3. The mobile radio device decodes the AICH, searches for the Acquisition Indicator AIs' belonging to its sent access preamble $P_{s'}$ and stores the signal of the received AICH. There are then once again the following options:
    a) if an Acquisition Indicator $AI_{s'}=1$ is received, the mobile radio device begins to send its message on the PRACH with the channelization code $C_{s'}$ 3 or 4 access slots after sending the last access preamble. The stored signal of the AICH is deleted.
    b) if an Acquisition Indicator $AI_s=-1$ is received, the base station has sent a negative acknowledgement for the seizure request. The mobile radio device then searches in the stored signal for a second positive decision value ACK2, i.e. for an additional Acquisition Indicator $AI2_{s'}=1$.
        If a second positive decision value ACK2 was detected, so all decision values NACK, NACK2, ACK contained in the stored signal will be detected. A channelization code $C_{s''}$ which is not currently available belongs to each of these decision values NACK, NACK2 and ACK. These channelization codes $C_{s''}$ are temporarily erased from the list of channelization codes available for this mobile radio device.
        If an available channelization Code CS is still present, the mobile radio device selects this code. If a number of channelization codes $C_s$ are present, the mobile radio device selects the code with the smallest index "S". Subsequently the mobile radio device begins to send its message N on the PRACH with the selected channelization code $C_s$ 3 or 4 access slots after sending the last access preamble.
        If no available channelization code $C_s$ is present, the mobile radio device ends the access attempt.
        If no second positive decision value ACK2 was detected, the mobile radio device also ends its access attempt.
4. if no response signal AWS is received at all, the mobile radio device selects a new preamble signature $P_{s'}$ as normal from the signatures allowed for it and sends the new access preamble AP at increased power in the next access slot available to it.

Use of the inventive method produces the following advantages:

A main advantage is that the use of the PRACH as a possible resource within the UMTS network is rendered more effective since seizure requests are only rejected if no further PRACH resources are actually free. Instead of the rejection of the seizure request, a signal is sent to the mobile radio device involved indicating the free channel on which it can send its message to the base station instead. In addition the method has the major advantage that the mobile radio devices and the base stations operating in accordance with the previous related art (i.e. in accordance with currently applicable UMTS norm), can continue to communicate without any changes with the corresponding base stations or mobile radio devices in each case which employ the inventive functionality. Where a seizure request in the form of an access preamble was not received by a base station, the inventive procedure does not give rise to any additional signaling overhead compared to the previous related art. This is also true if the seizure request in the form of an access preamble is positively acknowledged by the base station. An additional signaling overhead through the sending of the second positive decision value as well as the additional channel status information only arises if the benefits of this additional signaling are in place i.e. if a channelization code is actually free and compared to a known method it is possible for a terminal to send the message earlier. If on the other hand all channelization codes are occupied there is no additional signaling overhead since only the first negative decision value NACK has to be sent as before and the sending of a second positive decision value is simply dispensed with. A further advantage lies in the fact that the allocation of access priorities on the basis of different Access Service Classes (ASC) in the previous UMTS standard is not affected by the use of this method. Only the channelization codes predetermined with reference to the ASC are used.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for selecting a transmission channel for transmission and sending a message from a mobile terminal to a base station, comprising:

initially sending from the mobile terminal a send authorization request signal for a specific transmission channel to the base station;

sending from the base station to the mobile terminal a response signal containing a first decision value, wherein a first set of signature character sequences is used for encoding the first decision value in the response signal, the first decision value indicating whether the mobile terminal is authorized to send a message on the specific transmission channel and, if the first decision value indicates the mobile terminal is refused authorization to use the specific transmission channel and the mobile terminal is authorized to send a message on another transmission channel, the response signal including a second decision value, wherein said second decision value in the response signal is encoded using at least one signature character sequence orthogonal to the first set of signature character sequences, and wherein the at least one signature character sequence used for encoding the second decision value is created by multiplying only each second character of a signature character sequence of the first set of signature character sequences by −1;

analyzing by the mobile terminal, upon detection that the first decision value in the response signal is negative, the response signal to determine whether the second decision value is included in the response signal, indicating authorization of the mobile terminal to send a message on another transmission channel; and sending the message by the mobile terminal to the base station on one of the transmission channels available.

2. A method in accordance with claim 1, wherein a transmission channel to be selected is one of a number of logical channels implemented by using different channelization codes on a physical transmission channel used jointly by a number of terminals for transfer of messages to the base station.

3. A method in accordance with claim 2, wherein said sending of the response signal includes channel status information therein indicating to the mobile terminal which of the other transmission channels are available for sending the message.

4. A method in accordance with claim 3, wherein said sending of the response signal includes encoding at least one of the second decision value and the channel status information, when included, so that the first decision value can be decoded unchanged by the mobile terminal, regardless of whether the second decision value is included in the response signal.

5. A method in accordance with claim 4, wherein said encoding of the channel status information in the response signal uses the at least one signature character sequence orthogonal to the first set of signature character sequences.

6. A method in accordance with claim 5, wherein said encoding of the at least one of the second decision value and the channel status information in the response signal uses a second set of signature character sequences, with each signature character sequence of the second set of signature character sentences being created from a corresponding signature character sequence of the first set of signature character sequences by multiplying each second character by −1.

7. A method in accordance with claim 5, wherein said encoding of the at least one of the second decision value and the channel status information in the response signal uses a character string encoded with a specific signature character sequence orthogonal to the first signature character sequence set to jointly transfer the second decision value with the channel status information.

8. A method in accordance with claim 7, wherein the specific signature character sequence is assigned to the base station.

9. A method in accordance with claim 6,
wherein the first signature character sequence set is assigned to a specific transmission channel over which the mobile terminal has previously sent an access preamble to the base station, and
wherein said encoding of the second decision value uses a specific signature character sequence orthogonal to the first signature character sequence set.

10. A method in accordance with claim 9, wherein the channel status information includes a third decision value for each occupied transmission channel indicating unavailability.

11. A method in accordance with claim 10, wherein said sending of the response signal includes encoding each of the third decision values with the signature character sequences from the first set of signature character sequences assigned to the occupied transmission channels.

12. A method in accordance with claim 10, wherein said sending of the response signal includes encoding each of the third decision values with signature character sequences of the second set of signature character sequences assigned to occupied transmission channels, respectively.

13. A method for selecting a transmission channel for transmission of messages from a mobile terminal to a base station, comprising:

initially receiving at the base station of the mobile terminal a send authorization request signal for a specific transmission channel; and sending from the base station to the mobile terminal a response signal containing a first decision value, wherein a first set of signature character sequences is used for encoding the first decision value in the response signal, the first decision value indicating whether the mobile terminal is authorized to send a message on the specific transmission channel and, if the first decision value indicates the mobile terminal is refused authorization to use the specific transmission channel and the mobile terminal is authorized to send a message on another transmission channel, the response signal including a second decision value, wherein said second decision value in the response signal is encoded using at least one signature character sequence orthogonal to the first set of signature character sequences, and wherein the at least one signature character sequence used for encoding the second decision value is created by multiplying only each second character of a signature character sequence of the first set of signature character sequences by −1.

14. A method for selecting a transmission channel and transmission of messages from a mobile terminal to a base station, comprising:

initially sending from the mobile terminal to the base station an access preamble for a specific transmission channel;

receiving a response signal at the mobile terminal from the base station;

detecting at the mobile terminal a first decision value in the response signal, wherein a first set of signature character sequences is used for encoding the first decision value in the response signal, the first decision value indicating whether the mobile terminal is authorized to send a message on the specific transmission channel;

analyzing at the mobile terminal, upon detection that the first decision value indicates refusal of authorization for the mobile terminal to send the message on the specific transmission channel, the response signal to determine whether a second decision value therein indicates authorization for the mobile terminal to send the message on another transmission channel, wherein said second decision value in the response signal is encoded using at least one signature character sequence orthogonal to the first set of signature character sequences, and wherein the at least one signature character sequence used for encoding the second decision value is created by multiplying only each second character of a signature character sequence of the first set of signature character sequences by −1; and sending the message by the mobile terminal to the base station on one of the transmission channels available.

15. A base station with a transceiver unit and a processor unit for selecting a transmission channel for transmission of messages from a mobile terminal to the base station, comprising a decoding device detecting a send authorization request signal sent by the mobile terminal for a specific transmission channel;

a channel release unit determining which transmission channels are currently available for sending a message; and an encoding device generating a response signal to the mobile terminal containing a first decision value, wherein a first set of signature character sequences is used for encoding the first decision value in the response signal, the first decision value indicating whether the mobile terminal is authorized to send the message on the specific transmission channel and containing a second decision value when the first decision value indicates refusal of authorization for the mobile terminal to send the message on the specific transmission channel and the mobile terminal is authorized to send a message on another transmission channel, wherein said second decision value in the response signal is encoded using at least one signature character sequence orthogonal to the first set of signature character sequences, and wherein the at least one signature character sequence used for encoding the second decision value is created by multiplying only each second character of a signature character sequence of the first set of signature character sequences by −1.

16. A mobile radio network with a number of base stations in accordance with claim 15.

17. A mobile terminal selecting a transmission channel for transmission of messages from the mobile terminal to a base station, comprising:

a processor generating a send authorization request signal for a specific transmission channel and decoding a response signal sent by the base station to detect a first decision value, wherein a first set of signature character sequences is used for encoding the first decision value in the response signal, the first decision value indicating whether the mobile terminal is authorized to send a message on the specific transmission channel, said processor, upon detecting that the first decision value indicates refusal of authorization to send the message on the specific transmission channel, analyzing the response signal to determine whether a second decision value is included therein authorizing the mobile terminal to send the message on another transmission channel, wherein said second decision value in the response signal is encoded using at least one signature character sequence orthogonal to the first set of signature character sequences, and wherein the at least one signature character sequence used for encoding the second decision value is created by multiplying only each second character of a signature character sequence of the first set of signature character sequences by −1; and a transceiver unit sending the message to the base station on one of the transmission channels available.

18. A method in accordance with claim 1, wherein the second decision value included in the response signal furthermore indicates which other transmission channels are available for use by the mobile terminal.

19. A method in accordance with claim 13, wherein the second decision value included in the response signal furthermore indicates which other transmission channels are available for use by the mobile terminal.

20. A method in accordance with claim 14, wherein the second decision value included in the response signal furthermore indicates which other transmission channels are available for use by the mobile terminal.

* * * * *